(No Model.)

H. D. PERKY.
COFFEE ROASTER.

No. 575,983. Patented Jan. 26, 1897.

WITNESSES

INVENTOR
Henry D. Perky
By E. W. Anderson
His Attorney (No Model.)  
H. D. PERKY.  
COFFEE ROASTER.  
2 Sheets—Sheet 2.

No. 575,983. Patented Jan. 26, 1897.

WITNESSES  
GM Anderson  
Phille Masi.

INVENTOR  
Henry D. Perky  
by E. W. Anderson  
his Attorney

UNITED STATES PATENT OFFICE.

HENRY D. PERKY, OF WORCESTER, MASSACHUSETTS.

COFFEE-ROASTER.

SPECIFICATION forming part of Letters Patent No. 575,983, dated January 26, 1897.

Application filed February 7, 1896. Serial No. 578,396. (No model.)

*To all whom it may concern:*

Be it known that I, HENRY D. PERKY, a citizen of the United States, and a resident of Worcester, in the county of Worcester and State of Massachusetts, have invented certain new and useful Improvements in Coffee-Roasters; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
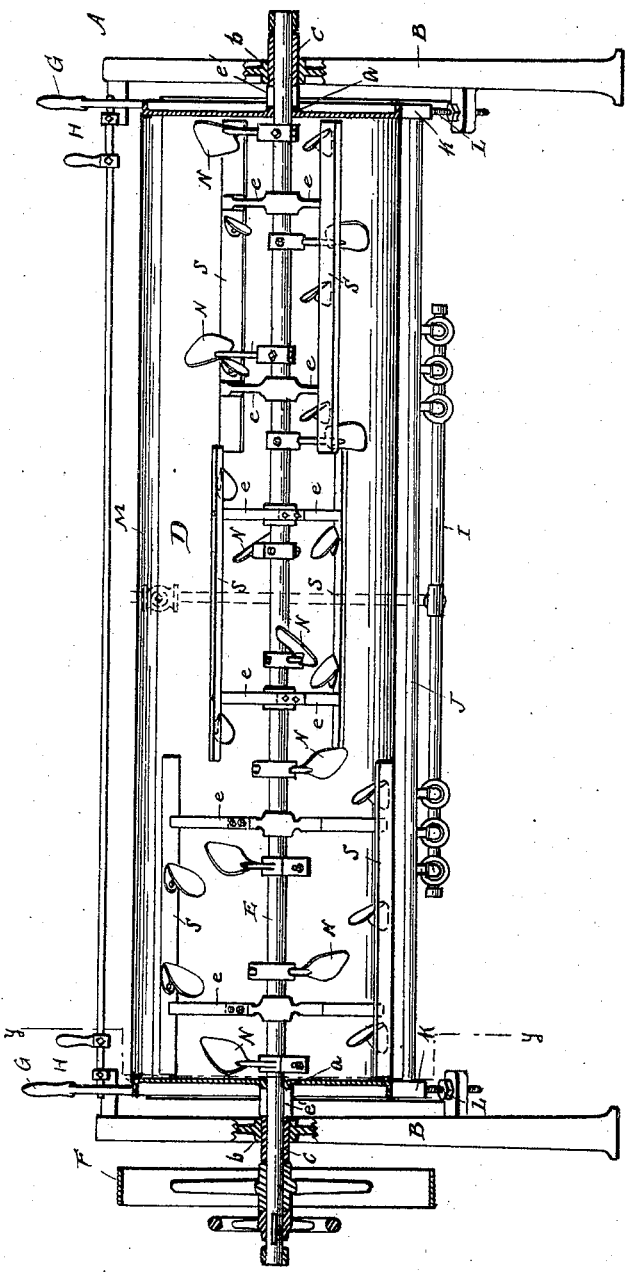
Figure 3:
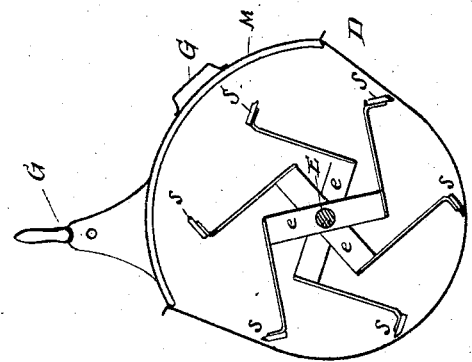
Figure 2:
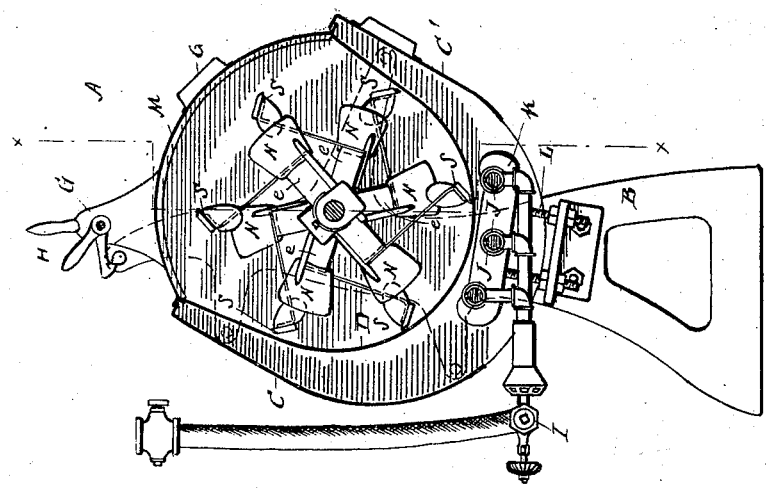

Figure 1 of the drawings is a representation of a section on line $x\ x$, Fig. 2. Fig. 2 is a section on line $y\ y$, Fig. 1. Fig. 3 is a sectional detail of roasting-pan with paddle-scrapers and stirring-blades removed.

This invention has relation to machines for roasting coffee and similar purposes; and it consists in the novel construction and combination of parts, as hereinafter set forth, and pointed out in the appended claims.

In the accompanying drawings the letter A designates the framework, having standards B B, and carrying the casing-walls C C', whereof the front portion C' is usually made in the form of a slide for convenience in moving the same when the roaster is to be discharged of its contents. The hollow casing formed by these walls is of approximately U shape in cross-section, the opening being at its upper portion. The bottom is also usually partially open to receive the heating devices, as hereinafter described.

The roasting-pan D is of semicylindrical form and usually somewhat inclined forward in its normal position, the back being higher than the front, and the casing has a corresponding inclination. The contents carried up the rear surface by the revolving scrapers fall over forward under their action. A centric shaft E, operated by means of a pulley F and suitable belting, is seated in hollow journals $a$ of the end walls of the pan, which journals $a$ extend through bearings $b$ of the standards in order to support the pan. The roasting-pan is capable of being tipped or turned to a certain extent upon its bearings in order to facilitate its discharge. It is provided with handles G and with releasing catch devices, as indicated at H. These catches serve to hold the pan in normal position until they are released for its discharge. Below the pan, in the open portion or bottom of the casing, are the gas-jet tubes J, which are supplied by means of the pipe I, which is designed to be provided with a section of rubber, as the gas-heater frame K is made adjustable upon bearings L of the main frame or support.

M indicates the cover of the roasting-pan.

To the shaft E are attached arms $e$, which carry at their ends the longitudinal revolving paddle scrapers S. These scrapers skim the wall of the roasting-pan in their movement by their beveled front edges, and the plane of the scraper is inclined backward from its contact edge with reference to the radial plane. The arms $e$ are of angular form, their inner portions being in radial relation to the shaft E and their outer portions bent at substantially right angles to their inner portions. These scrapers may be arranged serially in several sets along the shaft of a long roaster, the scrapers of each set being out of line with those of the next set in order to facilitate the endwise movement of the contents of the pan. This lateral movement is also assisted by means of inclined stirring-blades N, which may be attached to the scrapers or to independent arms secured to the shaft, or, if desired, to both scrapers and arms.

The hollow journals of the roasting-pan are elongated, as indicated at $c$, to extend through the bearings of the standards, so that the weight of the roasting-pan D is taken off the shaft. In order to prevent heating, these journals $a$ are slotted, as at $e'$, between the standards and the end walls of the roasting-pan.

Having thus described my invention, what I claim as new, and desire to secure by Letters Patent, is—

1. In a coffee-roaster, the combination with the frame having the fixed hollow casing open at its upper portion, of a semicylindrical forwardly-inclined roasting-pan pivotally supported therein so as to be capable of tilting with reference thereto, the rotary shaft extending longitudinally through the said pan, a series of scrapers carried thereby, and means whereby said pan may be secured against pivotal movement, substantially as specified.

2. In a coffee-roaster, the framework having the fixed casing-walls open at the upper portion, the longitudinal, semicylindrical roasting-pan pivotally supported in said casing-walls so as to be capable of tilting with reference thereto, the rotary shaft extending longitudinally through the said roasting-pan and having its projecting end portions journaled in bearings of the said framework, and the longitudinal scraping-paddles and stirring-blades carried by the said shaft, substantially as specified.

3. In a coffee-roaster, the combination with the pivotally-supported semicylindrical roasting-pan, of the rotary shaft extending longitudinally therethrough, the several sets of angular arms attached to said shaft, and having their inner portions in radial relation thereto, and their outer portions at substantially right angles to their inner portions, and longitudinally-extending scraper-blades carried by said arms and inclined backward from their contact edges with reference to their radial planes, said arms being so disposed that the blades of one set are out of line with those of the next set, substantially as specified.

4. In a coffee-roaster, the combination with the framework having the hollow casing open at its upper portion, and inclined forwardly, the front portion of said casing having a slide, the semicylindrical roasting-pan pivotally and eccentrically supported in said casing and closing the open portion thereof, the cover for said pan, and means for securing the pan against pivotal movement and for releasing the same, together with the heating devices below said pan and within the casing, substantially as specified.

5. In a coffee-roaster, the framework having the casing-walls open at the top, and at the lower portion, the front portion of said walls being a slide, the semicylindrical roasting-cylinder movably supported in said walls, and having handles and a cover, means for holding said cylinder in position, and for releasing the same, and means for heating said cylinder, substantially as specified.

6. In a coffee-roaster, the combination with the framework having the fixed casing-walls, of the semicylindrical roasting-pan movably supported therein and capable of tilting with reference thereto, said pan having handles, and a cover, supporting and releasing devices for said pan, the rotary shaft extending longitudinally through the said pan, and carrying scraping and stirring paddles and blades, and means for heating said pan, substantially as specified.

7. In a coffee-roaster, the combination with the framework having the standard B, B, and the casing-walls C, C', whereof the portion C' is a slide, of the semicylindrical roasting-pan supported within said walls, in forwardly-inclined position, and having at its ends elongated slotted journals which pivotally engage bearings of said standards, and an agitator-shaft extending through said pan and journaled in said boxes, substantially as specified.

8. In a coffee-roaster, the combination with the framework having the hollow casing of approximately U shape, with open portions at top and bottom, the forwardly-inclined, tiltable roasting-pan supported eccentrically in said casing and closing the open portion at the top thereof, the heating-burners within the open portion of said casing at the bottom, and an adjustable frame which supports said burners, substantially as specified.

In testimony whereof I affix my signature in presence of two witnesses.

HENRY D. PERKY.

Witnesses:
S. N. ROGERS,
J. M. STANLEY.